(12) United States Patent
Klesser

(10) Patent No.: US 6,887,017 B2
(45) Date of Patent: May 3, 2005

(54) SELF-GUIDED TRIM TOOL AND METHOD

(76) Inventor: Donald Edward Klesser, 108 Foxglove Dr., Baden, PA (US) 15005

( * ) Notice: Subject to any disclaimer, the term of this patent is extended or adjusted under 35 U.S.C. 154(b) by 205 days.

(21) Appl. No.: 10/267,684

(22) Filed: Oct. 9, 2002

(65) Prior Publication Data

US 2003/0077130 A1 Apr. 24, 2003

Related U.S. Application Data

(60) Provisional application No. 60/330,161, filed on Oct. 18, 2001.

(51) Int. Cl.$^7$ ............................................... B23C 5/10
(52) U.S. Cl. ......................................... 407/53; 407/56
(58) Field of Search ............... 407/53, 56; 144/138.95, 144/154.5, 240, 241

(56) References Cited

U.S. PATENT DOCUMENTS

| | | | | |
|---|---|---|---|---|
| 607,394 | A | * | 7/1898 | Hatch ........................ 144/231 |
| 1,014,794 | A | * | 1/1912 | Weirbach .................... 144/231 |
| 1,333,912 | A | * | 3/1920 | Hampson ................. 144/144.3 |
| 2,672,898 | A | | 3/1954 | Schuster |
| 3,289,717 | A | | 12/1966 | Dutot |
| 3,360,023 | A | * | 12/1967 | Rutzebeck ............... 144/134.1 |
| 4,221,514 | A | * | 9/1980 | Pavlovsky .................. 409/291 |
| 4,669,923 | A | | 6/1987 | McKinney |
| 5,433,563 | A | * | 7/1995 | Velepec ..................... 409/234 |
| 5,647,700 | A | | 7/1997 | Velepec |
| 5,662,435 | A | | 9/1997 | Sherman |
| 5,806,577 | A | | 9/1998 | Durand |
| 5,996,659 | A | * | 12/1999 | Burgess ...................... 144/347 |
| 6,048,142 | A | * | 4/2000 | Hashimoto et al. ..... 29/888.022 |
| 6,134,800 | A | | 10/2000 | Newman |
| 6,367,524 | B1 | | 4/2002 | Brewer |
| 2003/0039517 | A1 | * | 2/2003 | Golding, III ................. 407/42 |
| 2003/0147713 | A1 | * | 8/2003 | Dembicks ................... 409/182 |
| 2004/0062616 | A1 | * | 4/2004 | Pozzo ......................... 407/53 |

OTHER PUBLICATIONS

Roeider Woodworking & Hardware Catalog, Summer 1 2002: pp. 110, 132, Medina, MN.
Woodworker's Supply Catalog, May 2001; pp. 17, 18, 19; Casper, WY.
Grizzly Industrial Catalog, 2002; pp 310, 308, 312, 318, 323, Bellingham, WA.
Hartville Tool Catalog, 2001; p. 67, Hartville, OH.

* cited by examiner

Primary Examiner—A. L. Wellington
Assistant Examiner—Dana Ross

(57) ABSTRACT

A rotary trim tool (11) and method for trimming workpieces of various materials. The rotary trim tool comprises a shank (12), a trim guide (13), a cutting member (14), and a trim-depth guide (15). For use, the tool (11) is mounted in a rotatable machine, such as a router. The trim tool (11) is setup for trimming by adjusting its axial position in relation to the workpiece, and by using a trim-depth guide (15) of appropriate dimension. Using this method, the rotary trim tool (11) is capable of trimming the workpiece to precise dimensions.

10 Claims, 5 Drawing Sheets

SELF-GUIDED TRIM TOOL AND METHOD

CROSS-REFERENCE TO RELATED APPLICATIONS

This application is entitled to the benefit of Provisional Patent Application No. 60/330,161, filed Oct. 18, 2001.

FIELD OF THE INVENTION

This invention relates to a rotary trimming tool with guides, and a method for trimming workpieces.

BACKGROUND OF THE ART

Woodworkers, cabinetmakers, and craftsmen frequently trim an edge of a workpiece. These workpieces include cabinet doors, entry doors, countertops, etc. composed of materials such as wood, plastics, and man-made solid surface materials such as Corian™. The edge trimming operation typically requires the workpiece's long dimensions (width or length) be reduced by only a few tenths of a millimeter to 10 mm or more.

Edge trimming can be accomplished with the use of various tools or machinery, including, but not limited to, hand planes, powered planes, jointers, radial arm saws, table saws, handheld circular saws, and routers. Each of these tools and methods has inherent disadvantages. For example, hand and powered planes require worker skills to obtain the proper trim-depth and smoothness of cut. Additionally, planes typically cannot edge trim plastics and solid surface materials.

Tools such as jointers, radial arm saws, and table saws are stationary machines that require the workpiece be lifted onto the machinery for trimming. This can be very difficult for handling large workpieces, such as counter tops, and for trimming the width edge of long boards.

Woodworking routers and handheld circular saws are popular tools for performing the edge trimming operation because they are portable, result in a smoothly trimmed edge, and through the use of a guiding device, require lower skills than planes to trim the workpiece. A search of prior art reveals U.S. Pat. No. 6,134,800, a guiding device suitable for assisting in edge trimming. Other guiding device examples are found in woodworking catalogs. An example is a "Clamp 'N Tool Guide" described by Rockler Woodworking and Hardware, p. 110, consisting of a straightedge clamped to the workpiece to guide the router or handheld circular saw. Woodworker's Supply catalog describes other examples including a "Pro-ftr" available in 0.8 m (30"), 1.4 m (54") and 2.5 m (99") lengths on p. 17; a "Multi Angle Cutting Board" on p. 18; and a "Mitermate" on p. 19. The guiding devices heretofore described all suffer from one or more disadvantages:

The guiding device is separate from the router or circular saw and must attach to the workpiece for trimming. Due to inherent size limitations of each guiding device, it may not be capable of trimming oversized workpieces. For example, the 0.8 m (30") "Pro-ftr" would not be capable of guiding the router for trimming a 1.0 m (40") long board.

The guiding device is not easily adjusted to obtain accurate and consistent trim cuts. For example, to obtain a 0.25 mm (0.010") edge trim using the router, a straight router bit and the "Clamp 'N Tool Guide" requires the guiding device to be set a distance equal to ½ diameter of the router base minus ½ the diameter of the router bit diameter plus 0.25 mm (0.010") from the edge of the workpiece. This type of precision would not be obtainable using typical woodworking measuring tools such as a ruler or a tape measure.

Each guiding device consists of a straight-edge for guiding the router or circular saw and is not capable of trimming non-straight workpiece edges.

Edge trimming can be accomplished through use of an external router guide. A search of prior art revealed U.S. Pat. No. 2,672,898. Other external router guides are available from woodworking supply catalogs, including Rockler Woodworking and Hardware, p. 132. These external router guides attach to the router to assist in guiding a router bit for edge trimming. Due to their size and means of attachment, the external router guide is awkward to adjust and use during edge trimming.

Edge trimming can also be accomplished through the use of a self-guided router bit. These bits are readily available from woodworking tool suppliers and are variously described as rabbeting bits, piloted trim bits, pattern flush trim bits, and flush trim bits. Each of these bits uses an upper bearing or lower bearing to assist in guiding during the trimming operation. However, the lower bearing on the piloted, pattern or flush trim bits must contact an already trimmed workpiece surface, or an external guide surface during trimming in order to obtain a proper trim depth of cut. Whereas the rabbeting bit's lower bearing enables it to be self-guiding on an untrimmed workpiece edge, however, after a first trim pass, the bit leaves an uncut workpiece surface. The uncut workpiece surface must be subsequently removed using a handplane, flush trim bit, or by other method to complete the edge trimming operation.

There is a need for a tool for edge trimming, capable of:

Trimming many materials including wood, plastic and solid-surface materials,

Trimming oversized and non-straight edged workpieces,

Being self-guided without the use of external guiding devices,

Being easily and quickly setup to trim to precise dimensions,

Trimming without the need for changing router bits, or requiring the use of another tool or method to complete the operation.

SUMMARY

The present invention provides a rotary trim tool and method for precisely trimming workpieces comprising a shank, a rotary cutting member, a trim-depth control guide, and a trim guide.

OBJECTS AND ADVANTAGES

Accordingly the objects and advantages of this invention are to provide a trim tool and method capable of:

(a) trimming various materials, such as wood, plastic and solid-surface materials;

(b) being mounted in a portable router and thereby is capable of trimming oversized workpieces;

(c) being self-guiding and does not require attachment to the workpiece;

(d) being easy to setup and to obtain consistent trim depths;

(e) precisely removing a small amount of material of about a fraction of a millimeter (about several thousandths of a inch);

(f) following non-straight edged workpiece surfaces;

(g) completing the trimming operation without tooling changes or use of another method.

REFERENCE NUMBERALS IN DRAWINGS

| | |
|---|---|
| 11 trim tool | 32 untrimmed workpiece surface |
| 12 shank | 33 trimmed workpiece surface |
| 13 trim guide | AA trim-depth guide radial dimension |
| 14 cutting member | BB cutting member radial dimension |
| 15 trim-depth guide | CC trim guide radial dimension |
| 21 rotatable machine chuck | DD depth of cut |
| 31 workpiece | RM rotatable machine |

DESCRIPTION OF THE PREFERRED EMBODIMENT—FIGS. 1, 1A, 2

Figure 1:
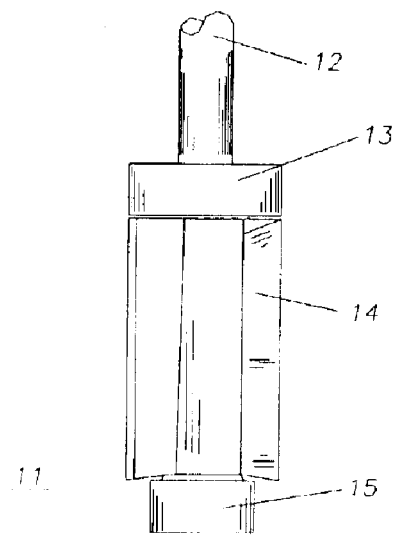
FIG. 1 is a side view of the preferred embodiment of the present invention illustrating a trim tool.
Figure 1A:
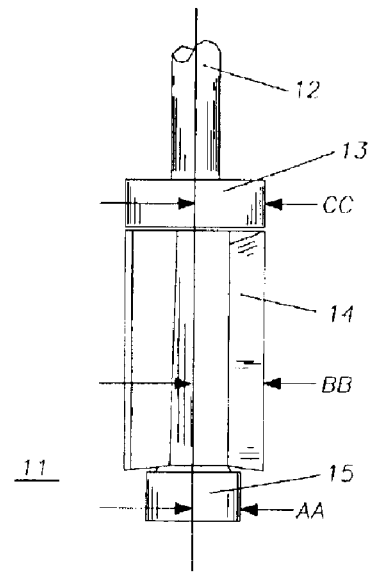
FIG. 1A is a side view of the trim tool illustrating radial dimensions.
Figure 2:
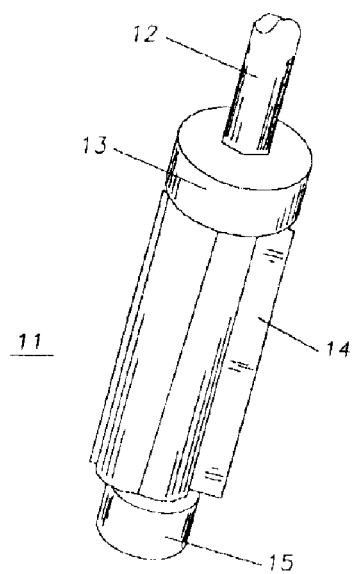
FIG. 2 is an isometric view of the trim tool illustrated in FIG. 1.

FIG. 1 and FIG. 1A are a side view of a trim tool 11 constructed in accordance with the invention. FIG. 2 is an isometric view of the trim tool 11.

The tool's shank 12 is a cylindrical rod typically made of steel. For use in a router, the shank 12 diameter will typically be 12.7 mm (½").

A trim guide 13 is integral with the shank 12, or is capable of being attachable to the shank 12. If attachable, the trim guide 13 may be mounted onto the shank 12 by press fitting, through the use of a collar typical for top-mounted bearing router bits, or some other attachment method. The trim guide 13 can be cylindrical, or of other shape. A cylindrical trim guide 13 would be similar to typical bearing guides used on laminate trim router bits and the like. The trim guide 13 may be made of steel, steel alloy, or some other wear-resistant material. The trim guide 13 radial dimension CC is the same as the cutting member 14 radial dimension BB (FIG. 1A).

The cutting member 14 is a tangential surface on the trim tool 11. The cutting member 14 may consist of a single cutting surface or a plurality of cutting surfaces. The cutting member 14 is made of hardened materials such as tool steel or tungsten carbide. The cutting member 14 may be a machined surface integral with the shank 12, may be carbide members brazed onto the shank 12, or is capable of being attached the shank 12. An example of an attachable cutting member is a screw on router bit available from Hersaf, Atascadero, Calif. The cutting member 14 is of an axial length capable of trimming the height or thickness of a workpiece. For example, for trimming a 19 mm (¾") thick board, the axial length of the cutting member 14 may be about 16 mm (⅝").

The trim-depth guide 15 can be cylindrical or of other shape, and may be made of steel, steel alloy, or some other wear-resistant material. The trim-depth guide 15 is preferably made of steel or steel alloy. The trim-depth guide 15 is integral with the shank 12 or is capable of being-attached to the shank 12. If attachable, the trim-depth guide 15 may be mounted by press fitting onto the shank 12, or through the use of a bearing screw typical for rabbeting-style router bits. The trim-depth guide 15 radial dimension AA is smaller than the cutting member 14 radial dimension BB (FIG. 1A).

Preferably the trim-depth guide 15 is attachable and available in a multitude of predetermined radial dimensions, for example 0.25 mm (0.010") increments. This feature provides the capability to vary the depth of trim by attaching a trim-depth guide 15 of the appropriate radial dimension.

DESCRIPTION OF AN ALTERNATIVE EMBODIMENT—FIG. 6

Figure 6:
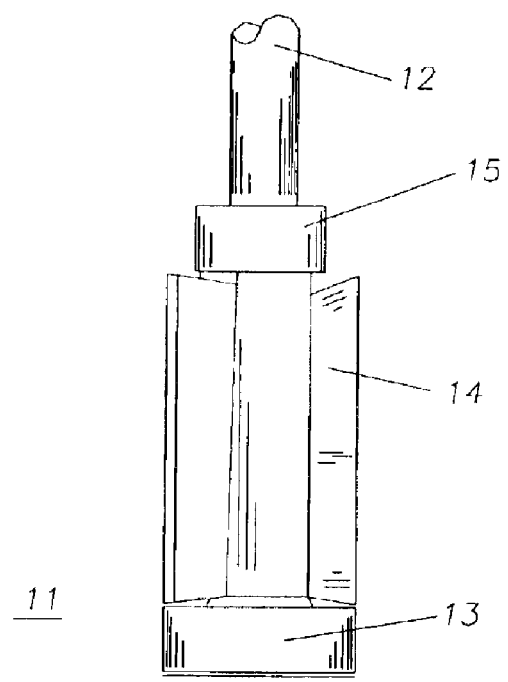
FIG. 6 is a side view of an alternative embodiment of the trim tool.

FIG. 6 illustrates a side view of an alternative embodiment of a trim tool 11 constructed in accordance with the invention. In this case, when compared to the preferred embodiment, the trim guide 13 and the trim-depth guide 15 are located at different positions on the shank 12. This alternative embodiment does not alter the basic operation of the trim tool 11.

ADVANTAGES

From the description above, a number of advantages of this invention become evident:

(a) The use of cutting members made of carbide enable the trim tool to trim many materials including wood, plastic and solid-surfacing materials.

(b) The trim tool can be mounted in a portable router which minimizes workpiece size restrictions.

(c) The trim tool is self-guiding through the use of the trim guide and trim-depth guide.

(d) The trim tool is easy to setup requiring only the selection and attachment of the appropriate trim-depth guide, and adjustment of the axial position of the trim tool.

(e) The dimensional difference between the cutting member and trim-depth guide enables the trim tool to obtain a consistent trim depth.

(f) Further, the dimensional difference between the cutting member and trim-depth guide need only vary by a small amount thereby enabling the trim tool to precisely remove a small amount of material.

(g) Cylindrically-shaped trim guides and trim-depth guides tangentially contact the workpiece thus minimizing the contact surface, and enabling the tool to follow irregularly shaped workpieces.

(h) The trim tool is capable of trimming by adjusting its axial location on the workpiece, and does not require the use of other tools or methods to complete the operation.

OPERATION OF THE PREFERRED EMBODIMENT—FIGS. 1, 1A, 3, 4, 5

To setup the trim tool 11 for removing a predetermined amount of material from a workpiece 31, an appropriate trim-depth guide 15 is selected. For example, if the desired trim depth is 1.6 mm (about ¹⁄₁₆"), then a trim-depth guide having a radial dimension AA (FIG. 1A) 1.6 mm less than a cutting member 14 radial dimension is attached to a shank 12.

Figure 3:
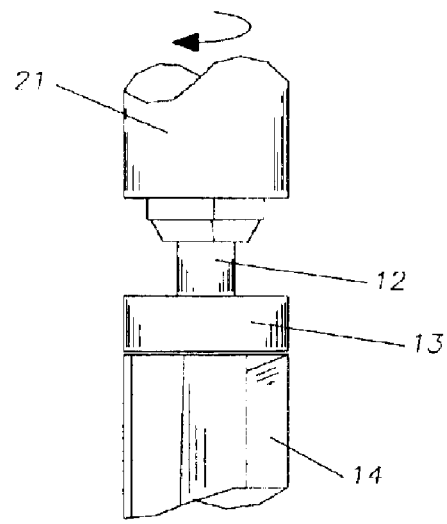
FIG. 3 is an upper partial side view of the trim tool illustrated in FIG. 1, with the tool mounted in a chuck of a rotatable machine.
Figure 4:
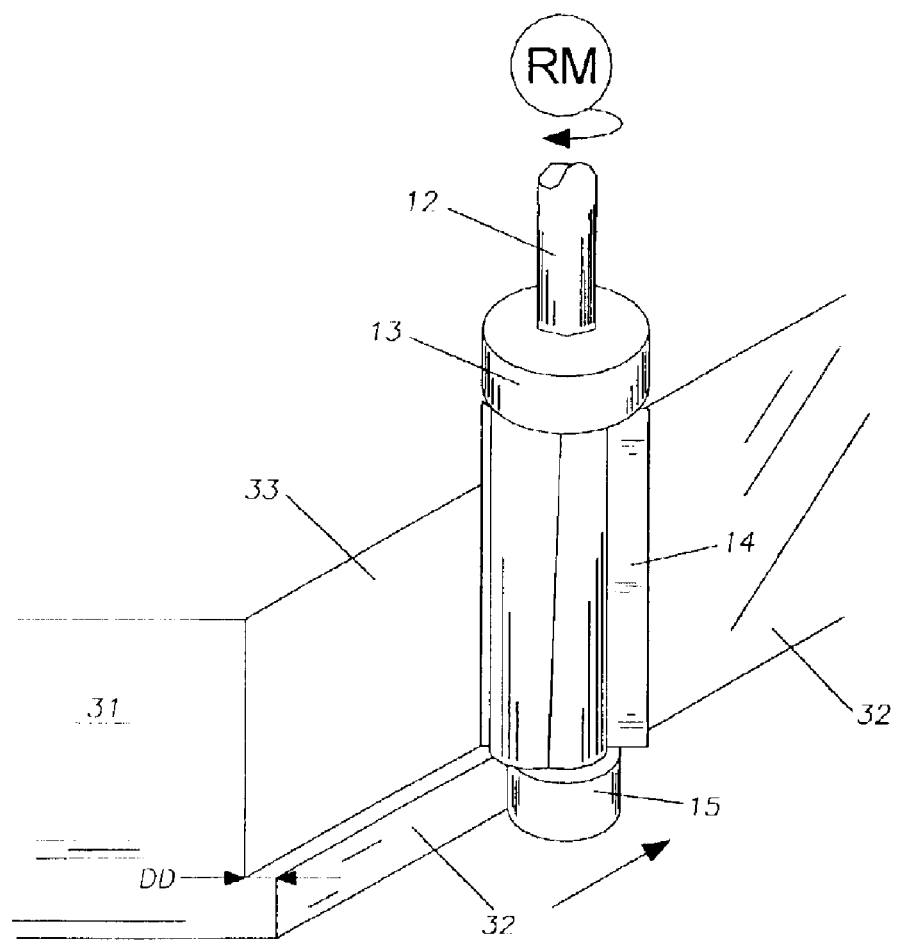
FIG. 4 is an isometric view of the trim tool illustrated in FIG. 1 trimming the workpiece during a first pass.
Figure 5:
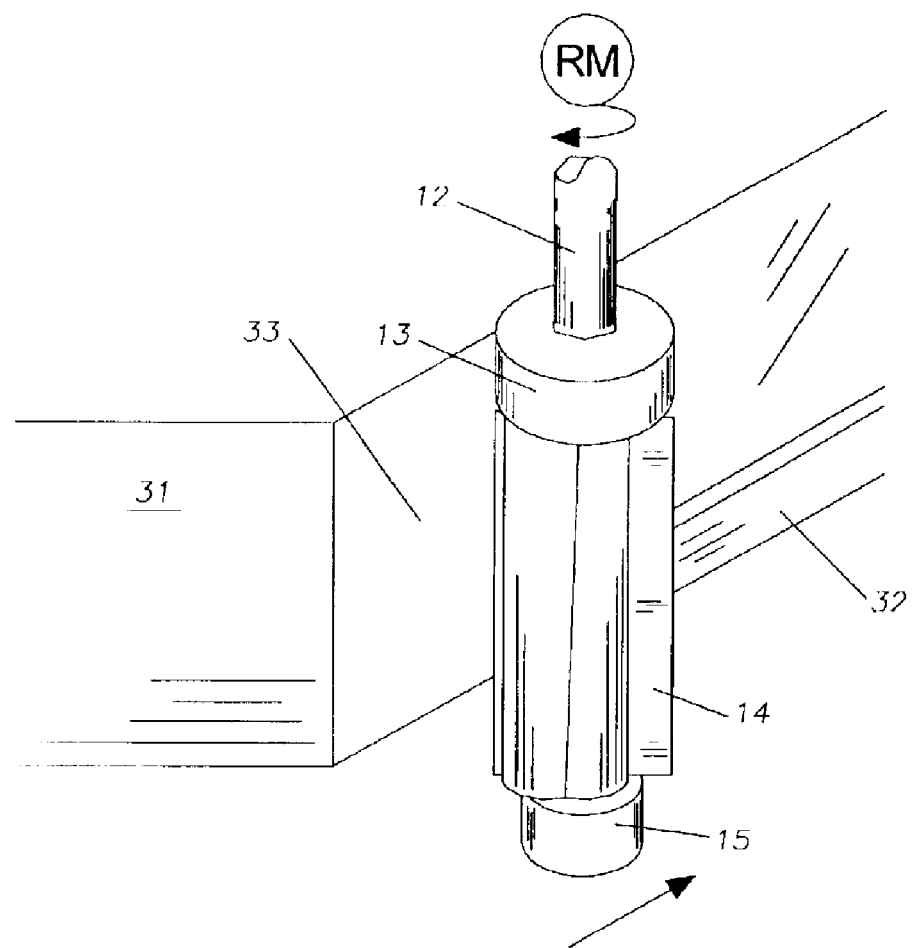
FIG. 5 is an isometric view of the trim tool illustrated in FIG. 1 completing a final trim pass on the workpiece.

The trim tool 11 is installed in a rotatable machine chuck 21 by the shank 12 (FIG. 3). The rotatable machine is typically a router, but may also be a milling machine, drill press or similar piece of machinery. A router is an appropriate rotatable machine RM (FIGS. 4, and 5) because it provides axial adjustment of the trim tool 11 in relation to the workpiece 31, it provides rotational force to the trim tool 11, and it provides transverse movement between the trim tool 11 and the workpiece 31 (FIGS. 4 and 5). Initially the trim tool 11 is axially adjusted in reference to a workpiece 31 so that the trim-depth guide 15 and the cutting member 14 contact the surface of the workpiece 31. Further in this position a trim guide 13 does not contact the workpiece 31.

After adjustment, the trim tool 11 is rotated and provided transverse movement with relation to the workpiece 31 by the rotatable machine RM (FIG. 4). The trim-depth guide 15 guides the trim tool 11 on the workpiece 31, and the cutting member 14 cuts and removes material from the workpiece 31. After cutting, the workpiece 31 consists of an untrimmed workpiece surface 32 previously contacted by the trim-depth guide 15 and a trimmed workpiece surface 33 produced by the cutting member 14. The depth of cut DD of the trimmed workpiece surface 33 in relation to the untrimmed workpiece surface 32 is equivalent to difference between the trim-depth guide 15 radial dimension AA and the cutting member 14 radial dimension BB (previously shown in FIG. 1A). For example, a trim-depth guide 15 having a radial dimension AA 1.6 mm smaller than the cutting member radial dimension BB will trim 1.6 mm (about 1/16") from the workpiece.

After this initial trim pass, the trim tool 11 is axially re-adjusted so that the trim guide 13 contacts the trimmed workpiece surface 33 of the workpiece 31 (FIG. 5). In this position the cutting member 14 will contact the untrimmed workpiece surface 32.

After re-adjustment, the trim tool 11 is rotated and provided transverse movement with relation to the workpiece 31 by the rotatable machine RM (FIG. 5). The trim guide 13 guides the trim tool 11 along the trimmed surface 33 and the cutting member 14 cuts and removes the untrimmed surface 32 and trims it flush with the trimmed surface 33.

CONCLUSION, RAMIFICATIONS, AND SCOPE

Accordingly, the reader will see that the trim tool of this invention has a number of advantages, including:
(a) it permits the trimming of various materials, such as wood, plastic and solid-surface materials;
(b) it is capable of trimming oversized workpieces;
(c) it is self-guiding and does not require attachment to the workpiece;
(d) it is easy to setup and to obtain consistent and precise trim depths;
(e) it is capable of trimming non-straight edged workpiece surfaces;
(f) it is capable of completing the trimming operation without tooling changes or use of another method.

Although the description above contains many specificities, these should not be construed as limiting the scope of the invention but merely providing illustrations of some of the presently preferred embodiments of this invention. For example, the cutting member may be composed of durable ceramics; the shank may be attachable to the body of the trim tool; etc. Thus the scope of the invention should be determined by the appended claims and their legal equivalents, rather than by the examples given.

What is claimed is:
1. A self-guided rotary tool for trimming workpieces, comprising:
(a) a shank that can be gripped in a chuck of a rotatable machine;
(b) a cutting member having a first end and a second end and a first maximum radial dimension mounted on said shank;
(c) a trim-depth guide mounted on said shank adjacent one of said first and second ends of said cutting member having a second radial dimension smaller than said first maximum radial dimension of said cutting member;
(d) a trim guide mounted on said shank adjacent another of said first and second ends of said cutting member having a third radial dimension equal to said first maximum radial dimension of said cutting member.
2. The self-guided rotary tool as in claim 1 wherein said cutting member is generally cylindrical in shape.
3. The self-guided rotary tool as in claim 1 wherein said cutting member is attachable to said shank.
4. The self-guided rotary tool as in claim 1 wherein said trim-depth guide is a cylindrically shaped bearing.
5. The self-guided rotary tool as in claim 1 wherein said trim-depth guide is attachable to said shank.
6. The self-guided rotary tool as in claim 5 wherein said trim-depth guide is one of a plurality of such differing diameter guides which is attachable to said shank.
7. The self-guided rotary tool as in claim 1 wherein said trim guide is guide is a cylindrically shaped bearing.
8. The self-guided rotary tool as in claim 7 wherein said trim guide is attachable to said shank.
9. The self-guided rotary tool as in claim 1 wherein cutting member has a plurality of predetermined axial lengths.
10. A method of trimming a workpiece using the self-guided rotary tool of claim 1, comprising the steps of:
(a) providing said shank wherein said self-guided rotary tool can be gripped by a chuck of a rotatable machine;
(b) setting an axial position of said self-guided rotary tool in relation to the workpiece so that said trim-depth guide contacts the workpiece surface, and said trim guide does not contact the workpiece surface;
(c) rotating said self-guided tool,
(d) providing transverse movement of said self-guided tool,
(e) guiding said cutting member along said surface of said workpiece and trimming a predetermined material trim depth from said workpiece leaving a trimmed surface, and an untrimmed surface previously contacted by said trim-depth guide,
(f) setting an axial position of said self-guided rotary tool in relation to the workpiece so that said trim-depth guide does not contact the workpiece surface, said cutting member contacts the untrimmed surface, and said trim guide contacts the trimmed surface,
(g) rotating said self-guided rotary tool,
(h) providing transverse movement of said self-guided rotary tool,
(i) guiding said cutting member along the surface of the trimmed workpiece surface providing a finish trimmed surface flush with the trimmed workpiece surface,
whereby a user can precisely and smoothly trim workpieces of various materials by a predetermined amount by use of only one tool and method.

* * * * *